US008115644B1

(12) United States Patent
Maiorana

(10) Patent No.: US 8,115,644 B1
(45) Date of Patent: Feb. 14, 2012

(54) WATER SKIING TRAINING DEVICE

(76) Inventor: Christopher P. Maiorana, Grosse Pointe Farms, MI (US)

(*) Notice: Subject to any disclaimer, the term of this patent is extended or adjusted under 35 U.S.C. 154(b) by 348 days.

(21) Appl. No.: 12/371,785

(22) Filed: Feb. 16, 2009

Related U.S. Application Data

(63) Continuation-in-part of application No. 12/201,322, filed on Aug. 29, 2008, now abandoned.

(60) Provisional application No. 60/969,605, filed on Sep. 1, 2007.

(51) Int. Cl.
*G08B 5/22* (2006.01)
*G09F 27/00* (2006.01)

(52) U.S. Cl. ......... 340/573.6; 340/668; 441/68; 700/91; 114/253; 116/26

(58) Field of Classification Search ............... 340/573.6, 340/668, 539.26, 573.1; 441/68–69; 114/253–254; 700/91; 116/26
See application file for complete search history.

(56) References Cited

U.S. PATENT DOCUMENTS

| 4,386,915 | A  | * | 6/1983  | Gilliam ...................... 434/253 |
| 5,694,337 | A  | * | 12/1997 | Macken ........................ 700/91 |
| 6,312,301 | B1 | * | 11/2001 | Kennedy ....................... 441/68 |
| 6,868,338 | B1 | * | 3/2005  | Elliott ......................... 701/213 |
| 7,618,312 | B1 | * | 11/2009 | Kasten ............................ 463/7 |
| 2001/0048484 | A1 | * | 12/2001 | Tamir et al. .................. 348/589 |
| 2003/0036814 | A1 | * | 2/2003  | Middleton ..................... 700/91 |

* cited by examiner

*Primary Examiner* — George Bugg
*Assistant Examiner* — Anne Lai
(74) *Attorney, Agent, or Firm* — Christopher P. Maiorana, PC

(57) ABSTRACT an apparatus comprising a sensor system and a controller. The sensor system may be configured to provide information about an angle of a ski rope relative to a ski pylon. The controller may be configured to provide (i) a first indication if the sensor indicates the ski rope reaches a target angle within a target time and (ii) a second indication if the sensor does not indicate the ski rope reaches the target angle be within the target time.

15 Claims, 3 Drawing Sheets

WATER SKIING TRAINING DEVICE

This is a continuation-in-part of U.S. Ser. No. 12/201,322, filed Aug. 29, 2008 now abandoned, which is incorporated by reference.

The present application claims the benefit of Provisional Application Ser. No. 60/696,605, filed Sep. 1, 2007, which is hereby incorporated by reference in its entirety.

FIELD OF THE INVENTION

The present invention relates to water skiing generally and, more particularly, to a method and/or apparatus for providing timing information to practice water skiing.

BACKGROUND OF THE INVENTION

Water ski courses are used in professional and armature tournaments. Courses include 6 buoys (sometimes 4 buoys) in a symmetrical pattern. A skier needs to turn around the buoys. If a skier is successful, the boat driver shortens the ski rope and the skier repeats the course run. The rope is shortened until the skier is unable to complete the course. The last successful buoy (or ball) is recorded as the skiers score. For example, a skier may run 5 balls at 35 off. Many speed variations are possible.

Training on a course is both difficult and time consuming. The buoys are secured to the bottom on the lake on some sort of anchoring system. However, the buoys often become dislodged and need to be reattached. Such reattachment (a regular maintenance item), is time consuming and often frustrating. For example, if a skier wants to train early in the morning, when the water conditions are often optimal, the last thing such a skier wants to do is perform course maintenance. Ski courses are also expensive.

Also, in some locations a ski course may not be legally possible or even practical. Some skiers without regular course access would like to train for a course.

It would be desirable to implement a method and/or apparatus that may be used to simulate the timing needed for a skier to ski a water ski course.

SUMMARY OF THE INVENTION

The present invention concerns an apparatus comprising a sensor system and a controller. The sensor system may be configured to provide information about an angle of a ski rope relative to a ski pylon. The controller may be configured to provide (i) a first indication if the sensor indicates the ski rope reaches a target angle within a target time and (ii) a second indication if the sensor does not indicate the ski rope reaches the target angle be within the target time.

The objects, features and advantages of the present invention include providing a water skiing training system that may (i) provide timing feedback to a skier, (ii) be mounted along with traditional boat electronics, and/or (iii) be used to provide ski course cues used for open water training.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
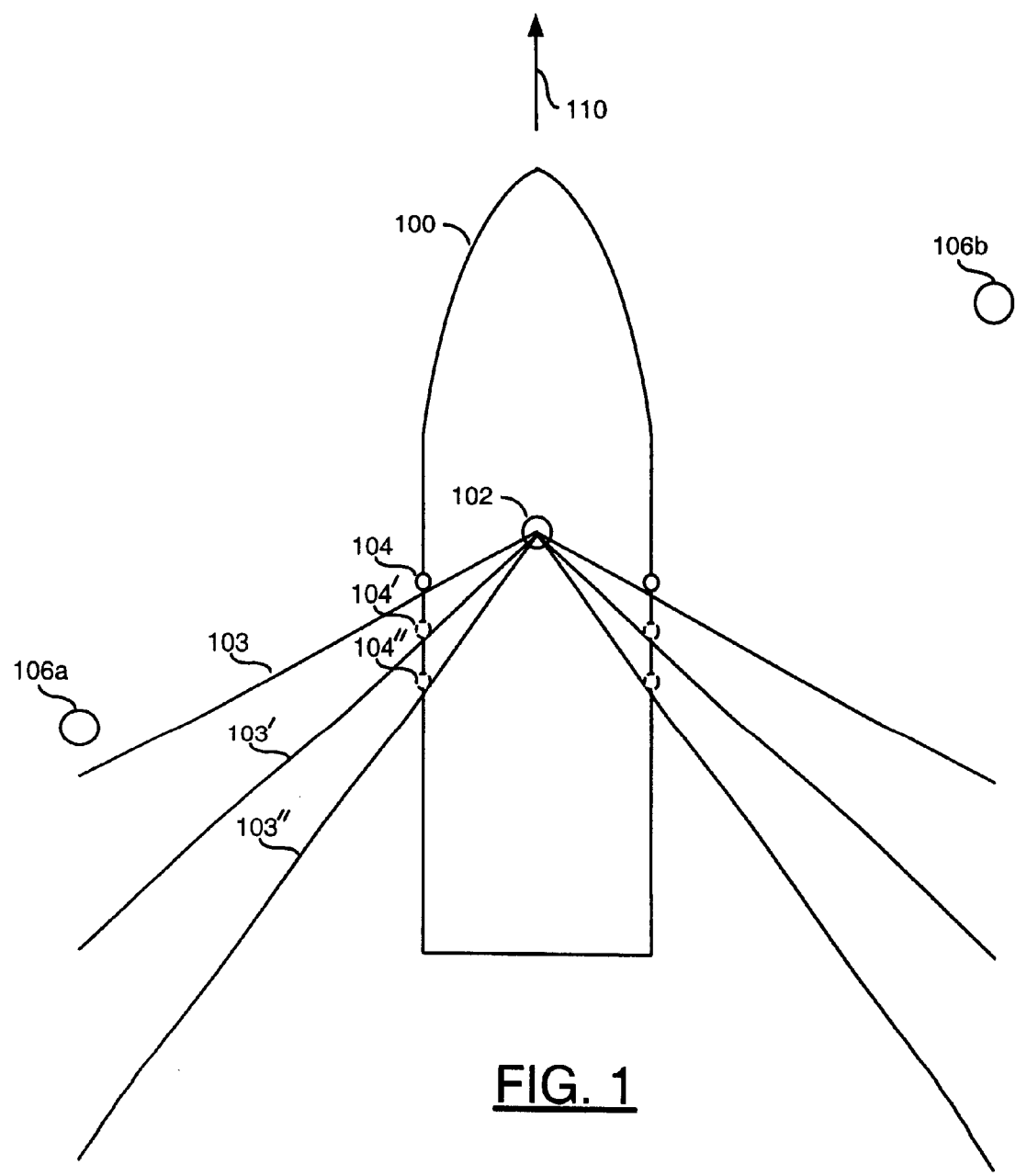
FIG. 1 is a diagram illustrating a basic embodiment of the present invention.

Referring to FIG. 1, a top view of a boat 100 is shown in accordance with a preferred embodiment of the present invention. The boat 100 includes a pylon 102. A ski rope 103 is shown in various positions (e.g., 103', 103", etc.). The boat also includes a sensing device 104. The sensing device 104 is shown in various positions (e.g., 104, 104' and 104", etc.) along the side of the boat 100. A buoy 106a and a buoy 106b are shown. As the boat 100 moves in a direction shown by an arrow 110, a skier pulls the rope 103 to each side of the boat far enough over to reach the buoy. For example, the rope 103 has a first length that reaches the buoy 106a when the rope 103 touches the sensor 104. When the sensor 104' is moved back toward the boat, the rope 103' is longer. Similarly, the rope 103" shows a position where the rope is either longer, and touches the sensor 104". In general, the shorter the length of the rope 103, the more angle a spear must accomplish compared with the pylon.

Figure 2:
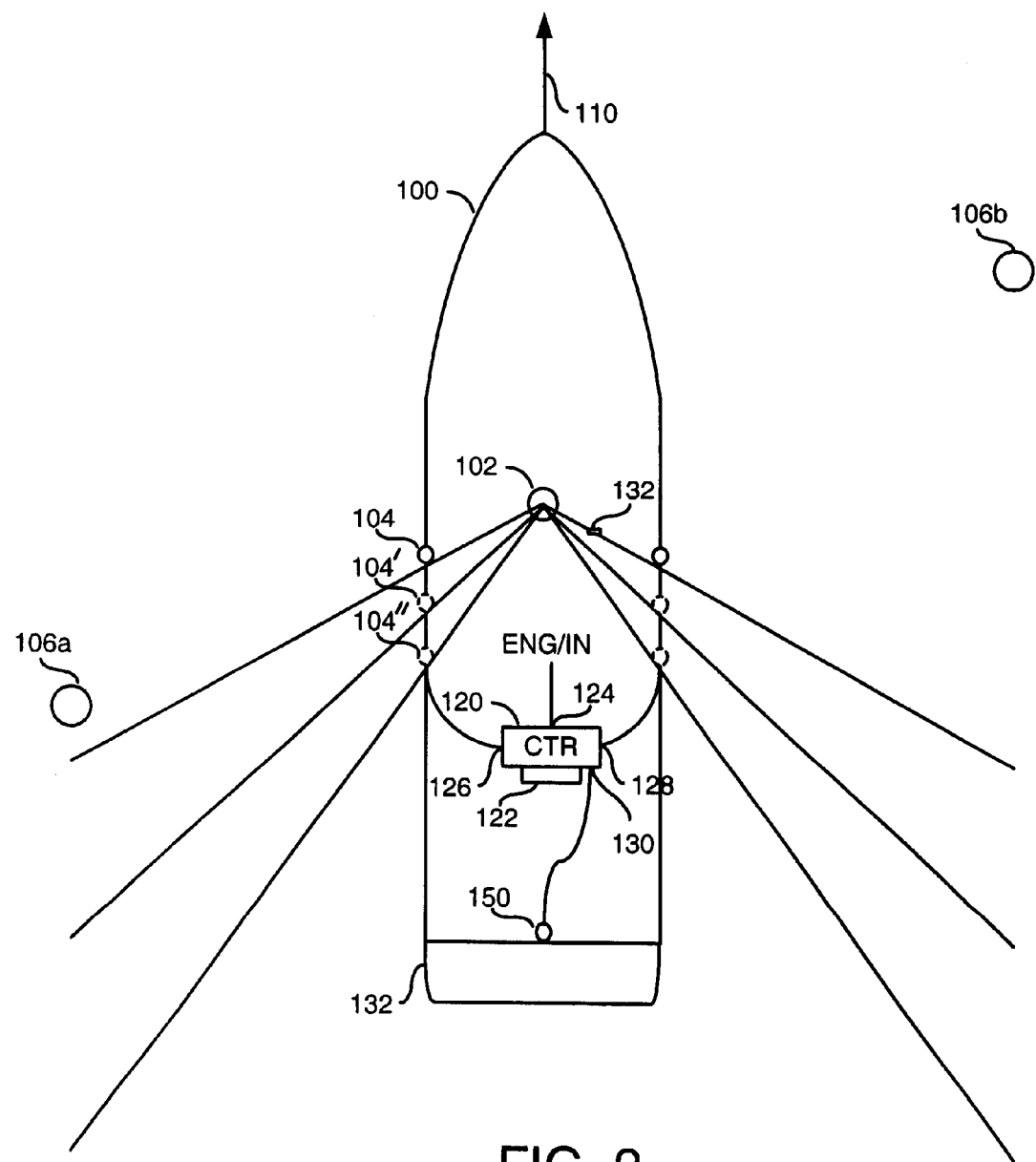
FIG. 2 is a more detailed embodiment of the present invention.

Referring to FIG. 2, a more detailed diagram of the boat 100 is shown. A controller 120 is shown having an input 126 connected to the sensor 104" and an input 128 connected to the sensor 104b". An input 124 may receive signals from an engine and/or from a boat operator. The controller 120 also has a display 122. While the display 122 is shown attached to the controller 120, the display may be located in a convenient position around the boat. For example, the display 122 may be mounted on the back of the boat near the ski/swim platform 132. A sensor 150 may be implemented to show when a skier passes the back of the boat 100. The sensor 150 may be used to simulate when a skier passes through the start and end gates on a ski course. The controller 120 may be implemented as a processor, microprocessor, or other processing device. The controller 120 may be configured to receive input signals, input parameters, etc. The controller 120 may store such parameters. The controller 120 may be configured to generate pass/fail indication signals in response to such input signals. The controller 120 may have a built-in clock, or may receive an external clock signal. The controller 120 may have a memory to store parameters from a ski pass.

Figure 3:
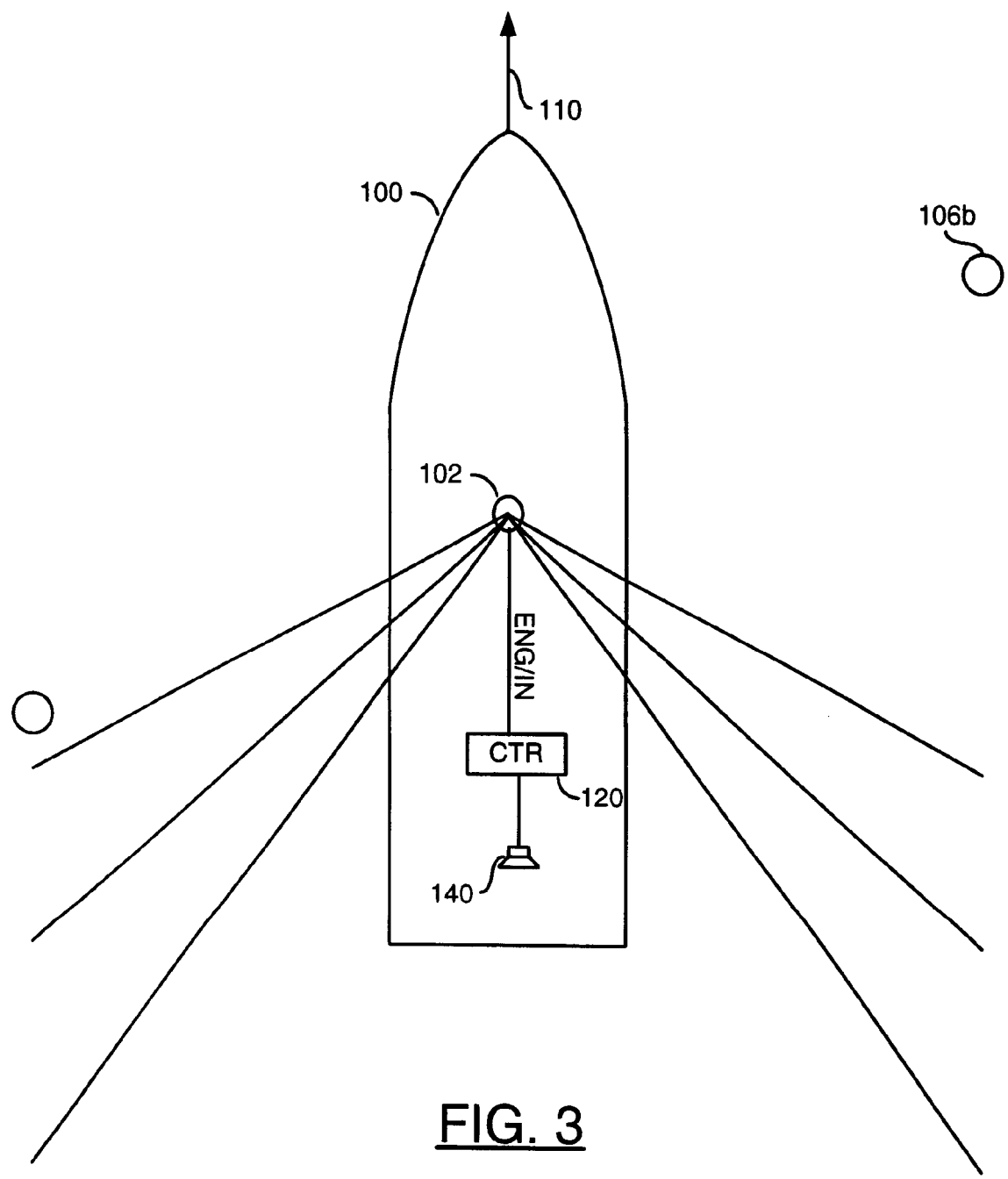
FIG. 3 is a diagram illustrating various alternate implementations of the present invention.

Referring to FIG. 3, a diagram illustrating alternate implementation is shown. The pylon 102 may be implemented to include a sensor that may be sued to provide a signal (e.g., IN) to the controller 120 that indicated the position of the rope 103 in terms of an angle (e.g., A). In one example, the angle A may represent an angle with respect to the direction 110. By implementing the pylon with an angle sensor, mounting the sensors 104 on the boat 100 may be eliminated. The controller 120 may be mounted under the dashboard of the boat 100, for example near the speed control system of the boat 100. A target time may represent the time that a skier needs to have the rope 103 reach a certain angle on the pylon sensor. The controller 120 may calculate a target time based on simulating a desired boat speed and rope length. In one example, the boat speed may be either manually entered into the controller 120 by a user. In another example, the boat speed may be an input the controller 120 for either the electronics of the boat 100, a speed control system, a speedometer sensor, a paddle wheel, etc. To simulate the start and end of a ski pass (e.g. the gates on a course), the controller 120 may start each timing increment as the skier passes the back of the boat 100. A speaker 140 is shown that may be used to provide a sound indication of a pass/fail condition.

The angle sensor in the pylon may be implemented in a variety of ways. In one example, the rope may be secured to the outer portion of a typical pylon 102. The outer portion typically moves with the rope on a set of bearings attached to the fixed portion of the pylon 102. The angle sensor may be implemented between the fixed portion and the angular portion of the pylon 102. In one example, the rope 103 may be fixed to the pylon using an arm that extends from the pylon, similar to the arms on a photo mounting apparatus used to video tape a ski run. In another example, a video camera may be mounted above the ski pylon, for example on a wake board tower. The video camera might point down at the rope connection to the pylon. The controller may receive a video signal and convert the angle of the rope seen in the video signal to a digital value that may be used to make the angle calculations. By mounting a video camera on an elevated position, such as a wake board tower, a damping type factor may be implemented in the controller 120. In particular, the vibrations from the ski rope may be averaged out by implementing an appropriate process in the controller 120.

The display may be implemented a visual indication of a good or a bad pass by implementing different color lights. For example, a green light may indicate a passing turn. A red light may indicate a failing turn. The particular colors may be varied. If a sound indication is used, a pleasing sound, like a windows chime, may be used for a passing sound. A raspberry sound may be used for a failing sound. The particular sound may be varied. A sound indication may be implemented by passing a signal to the sound system of the boat 100. The sound system may be adjusted to provide enough sound to be heard over the normal boat and/or water sound present while skiing. Alternately, the sound indication may be broadcast over a wireless link to a set earphones worn my the skier. In another example, a set of head-up glasses may be worn by the skier. Such heads-up glasses may be used to project the pass or fail visual indicators to a peripheral portion of view of the skier.

The controller 120 may also receive a signal from a tension gauge 132 that may be connected to the rope 103. The tension gauge may be use to provide information to the controller 120 on how hard a skier is pulling on the rope (e.g. a tension parameter). The tension, along with the various timing and angle parameters may be stored in the controller 120. The controller 120 may then present such parameters to a ski simulator. The ski simulator may be implemented as a software simulator on a computer, as a stand alone simulator that may run on a gaming system, or any other appropriate simulator. Such a simulator may play back a skiers ski run in a graphical format. The particular format may be varied. For example, a view as seen by a skier may be implemented, an overhead view may be implemented, etc. Such a simulator may be trained by having different skiers perform ski runs, then using such information to tune the simulator software to make the simulated skiers show a particular form in the simulation based on the known results. Additionally, the simulated playback of a ski run may be compared to the run of a more experienced skier. Such comparison may allow a skier to learn where they are on the course in comparison with a more experienced skier.

An optional GPS input may be presented to the controller 120. The GPS may provide a variety of information. For example, the GPS may be used by the boat driver to ensure a straight path of the boat 100. Such GPS control may be particularly useful, since traditional boat buoys are not present when training without a course. In one example, the GPS input may be used and an input to an autopilot to drive the boat in a straight direction. In such an autopilot system, a boat operator may maintain override control of the boat 100. The GPS may also be used to ensure proper boat speed by indicating to a boat driver when simulated buoys would have passed.

The functions performed by the controller 120 and/or the software simulator may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a sensor system configured to provide information about an angle of a ski rope relative to a ski pylon;
a controller configured to (i) provide a first indication if said sensor indicates said ski rope reaches a target angle within a target time, (ii) provide a second indication if said sensor does not indicate said ski rope reaches said target angle be within said target time, (iii) store a series of angles and times representing when a skier had changed directions and (iv) receive and store a series of tension parameters; and
a simulator configured to generate a graphical playback of a ski run based on said angles, said times and said tension parameters, wherein said tension parameters are used in said graphical playback to indicate a particular type of ski form.

2. The system according to claim 1, wherein said target time is calculated to correspond to simulating a particular boat speed.

3. The apparatus according to claim 1, wherein said target angle is calculated to simulate a particular rope length.

4. The apparatus according to claim 1, wherein said first indication comprises a first visual indication and said second indication comprises a second visual indication.

5. The apparatus according to claim 1, wherein said first indication provides an audible indication and said second indication provides an audible indication.

6. The apparatus according to claim 5, wherein said apparatus is implemented on a boat.

7. The apparatus according to claim 6, wherein said audible indications are provided by presenting a signal to a sound system of said boat.

8. The apparatus according to claim 6, wherein said sensor apparatus comprises a first sensor mounted on a first side of said boat and a second sensor mounted on a second side of said boat, wherein said first and second sensors are located at predetermined positions configured to indicate said target angle.

9. The apparatus according to claim 6, wherein said sensor apparatus comprises an angular sensor mounted on a pylon of said boat.

10. The apparatus according to claim 1, wherein said graphical playback is generated in further response to a boat speed parameter, a skier weight parameter, and a rope tension parameter.

11. The apparatus according to claim 1, wherein said graphical playback is simulated from a view as seen by a skier.

12. The apparatus according to claim 1, wherein said graphical playback is simulated from a view as seen from overhead.

13. The apparatus according to claim 1, wherein said simulator comprises a software simulator on a computer.

14. The apparatus according to claim 1, wherein said simulator comprises a stand alone simulator.

15. The apparatus according to claim 1, wherein said simulator compares said ski run to a second ski run of an experienced skier.

* * * * *